(12) United States Patent
Ackerman

(10) Patent No.: US 7,257,512 B1
(45) Date of Patent: Aug. 14, 2007

(54) METHODS AND SYSTEMS FOR VIBROPENDULOUS ERROR COMPENSATION OF ACCELERATION SENSORS

(75) Inventor: John F. Ackerman, Mounds View, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/399,909

(22) Filed: Apr. 7, 2006

(51) Int. Cl.
*G06P 15/00* (2006.01)
(52) U.S. Cl. ........................................ 702/141; 73/488
(58) Field of Classification Search ................. 702/141
See application file for complete search history.

(56) References Cited

U.S. PATENT DOCUMENTS

| | | | |
|---|---|---|---|
| 3,451,643 A * | 6/1969 | Sargent et al. ................ 244/3.2 |
| 3,618,401 A * | 11/1971 | Lacey ..................... 73/514.21 |
| 4,599,896 A | 7/1986 | Stewart |
| 4,611,491 A | 9/1986 | Brown et al. |
| 6,421,622 B1 * | 7/2002 | Horton et al. ................. 702/95 |
| 6,498,996 B1 | 12/2002 | Vallot |
| 6,705,166 B2 | 3/2004 | Leonardson |
| 6,745,627 B1 | 6/2004 | Woodruff et al. |
| 6,897,538 B2 | 5/2005 | Eskridge |
| 6,910,379 B2 | 6/2005 | Eskridge et al. |
| 6,912,902 B2 | 7/2005 | Malametz et al. |
| 6,938,334 B2 | 9/2005 | Yu |

FOREIGN PATENT DOCUMENTS

GB    2 158 243 A    5/1984

* cited by examiner

*Primary Examiner*—Bryan Bui
*Assistant Examiner*—Jonathan Moffat
(74) *Attorney, Agent, or Firm*—Evan Bundis, Esq.; Armstrong Teasdale LLP

(57) ABSTRACT

A method for reducing effects of vibropendulous errors within a sensor device having three orthogonal sensors is described. The method includes calculating compensation terms for each sensor, the compensation terms associated with an angle between a pendulous axis for the sensor and a cross axis of the sensor, and subtracting the compensation terms for each sensor from data received from that sensor.

18 Claims, 4 Drawing Sheets

METHODS AND SYSTEMS FOR VIBROPENDULOUS ERROR COMPENSATION OF ACCELERATION SENSORS

BACKGROUND OF THE INVENTION

This invention relates generally to operation of sensor devices, for example, micro-electromechanical system (MEMS) and discrete component sensor devices, and more specifically, to methods and systems for compensation of data originating from the operation of these sensor devices.

Certain sensor based devices, for example, pendulous mass accelerometers and gyroscopes, incorporate one or more suspended components that are subject to vibropendulous effects during operation. An example of such a component is a proof mass of a MEMS based sensor device. The vibropendulous effects are caused by forces that might placed on the suspended components during accelerations. Specifically, such forces are those that have elements that are perpendicular to a "pendulum axis" of each individual suspended component. The pendulum axis is an axis about which the suspended component is designed to vibrate. Any forces in the other axes may also cause a vibration in that axis, which is referred to as vibropendulous effects, which can result in bias errors in the data generated by the operation of the suspended components.

One known sensor device utilizes an auxiliary sensor to provide compensation for vibropendulous errors using analog signal correction. However, such a solution requires the addition of additional components (i.e., the additional sensor and supporting electronics) to the sensor device incorporating such a solution. Addition of components increases cost and complexity while further increasing a probability of component failure within the sensor device due to the increased number of components therein.

BRIEF SUMMARY OF THE INVENTION

In one aspect, a method for reducing effects of vibropendulous errors within a sensor device is provided where the device includes three orthogonal sensors. The method includes calculating compensation terms for each sensor, the compensation terms associated with an angle between a pendulous axis for the sensor and a cross axis of the sensor, and subtracting the compensation terms for each sensor from data received from that sensor.

In another aspect, a navigation system is provided that includes a processor and three orthogonally positioned accelerometers. Each accelerometer is configured to provide acceleration data to the processor, and the processor is programmed to compensate the acceleration data received from each accelerometer. The compensation is associated with an angle between a pendulous axis for a respective accelerometer and each cross axis of the accelerometer.

In still another aspect, an inertial measurement unit comprising three orthogonally positioned accelerometers is provided. Each accelerometer is configured to provide acceleration data, and the inertial measurement unit is programmed to compensate the acceleration data received from each accelerometer. The compensation is associated with an angle between a pendulous axis for a respective accelerometer and each cross axis of the respective accelerometer.

DETAILED DESCRIPTION OF THE INVENTION

Herein described are method and systems that utilize the capabilities of three orthogonally positioned sensors, for example, MEMS-based accelerometers, other micro-fabricated silicon sensing elements, and other accelerometer embodiments, including traditional accelerometers fabricated from discrete components, to perform signal corrections for each individual sensor, based on a position of the other two sensors.

Figure 1:
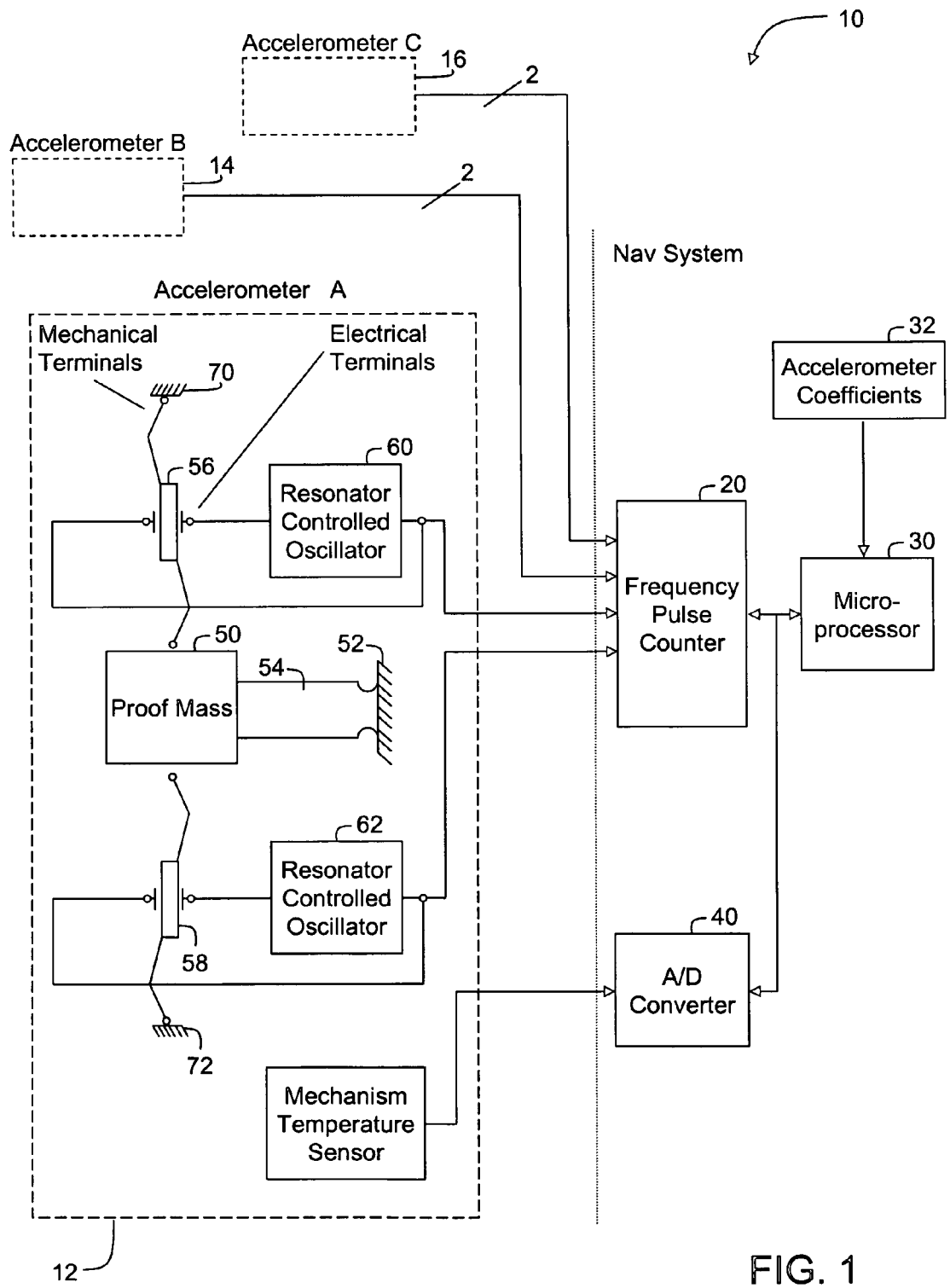
FIG. 1 is a block diagram of a navigation system incorporating three orthogonal accelerometers.

FIG. 1 is a block diagram of a navigation system 10 that includes three orthogonally situated accelerometers 12, 14, and 16. Navigation system 10 includes a pulse counter 20 that is configured to receive signals from accelerometers 12, 14, and 16. Pulse counter 20 outputs data, based on the operation of accelerometers 12, 14, and 16, to a microprocessor 30, which is programmed with accelerometer coefficients 32. An A/D converter 40 may receive other signals from one or more of accelerometers 12, 14, and 16, for conversion of signals to data for input into microprocessor 30. In the illustrated embodiment, a signal relating to accelerometer temperature is received by A/D converter 40.

Accelerometer 12 is illustrated in detail in FIG. 1 and the components therein are illustrative of accelerometers 14 and 16, other than the above described orthogonal orientation of accelerometers 12, 14, and 16. Now referring specifically to accelerometer 12, it includes a proof mass 50 that is mechanically mounted to an anchor 52 by a suspension 54. Anchor 52 and suspension 54 allow proof mass 50 to vibrate in a lateral direction between electrical terminals 56 and 58 which are respectively coupled to oscillators 60 and 62. Mechanical terminals 70 and 72 couple proof mass 50 to electrical terminals 56 and 58 and the vibration of proof mass 50 thereby causes a signal to be output by oscillators 60 and 62.

Proof mass 50 is configured to vibrate about an axis substantially extending through anchor 52. This axis is referred to as the input axis. However, it is known that during operation of accelerometer 12 (as well as accelerometers 14 and 16) there is movement of proof mass in the axes that are perpendicular to the axis extending through anchor 52. The movement of proof mass 50 in these axes is the source of vibropendulus errors.

Figure 2:
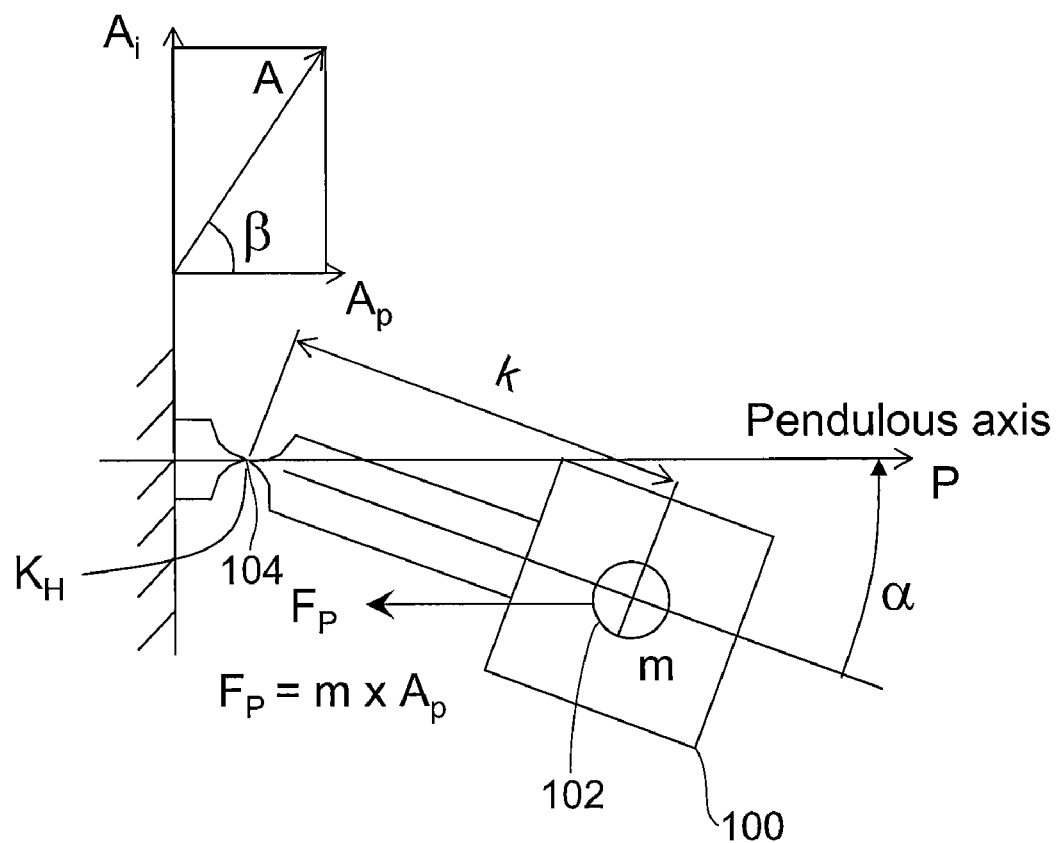
FIG. 2 is an illustration of a pendulous accelerometer 100 that is accelerated from its pendulous axis.

Accelerometers like accelerometer 50 are sometimes referred to as being open-loop pendulus accelerometers. Generally, and as briefly described above, open-loop pendulus accelerometers are accelerometers having proof masses that deviate from the input axis under an applied acceleration. These proof masses have a tendency to develop off-axis errors, which are illustrated in FIG. 2 which illustrates a single cantilever pendulous accelerometer 100 that is accelerated at an angle β from its pendulous axis. The acceleration, A, has a first component, Ai, acting directly on the sensitive axis (input axis) of accelerometer 100 and a second component, Ap, acting perpendicular to the sensitive axis. Proof mass 102 of accelerometer 100 is deflected away from the pendulum axis, p, by the Ai component of acceleration. As the distance of the proof mass from the pendulum axis increases, Ap acts to add to the torque on the pendulum, therefore increasing the pendulum's deflection even more. This deflection ultimately yields an incorrect output signal.

As seen in FIG. 2, the error torque on the hinge, or suspension 104 of accelerometer 100, called the vibropendulous error, is given by $T=Fp \times \alpha \times k$, where Fp is the inertial force acting parallel to pendulous axis, $\alpha$ is the pendulum angular displacement which is equal to $$\frac{m \times A \times k}{K_H} \sin\beta,$$

k is a length from the hinge to the center of gravity of the proof mass, m is the mass of the proof mass, A is the acceleration, $K_H$ is the rotational stiffness, or spring constant, of the suspension, and $\beta$ is the angle between the acceleration and the pendulous axis.

Since $Fp=m \times Ap$, the cross-coupling error torque, or vibropendulous error, T, is $$\frac{m^2 \times A^2 \times k^2}{K_H} \cos\beta.$$

The vibropendulous error increases as the spring constant of the suspensions decreases and with larger angles of deflection, $\alpha$.

Figure 3:
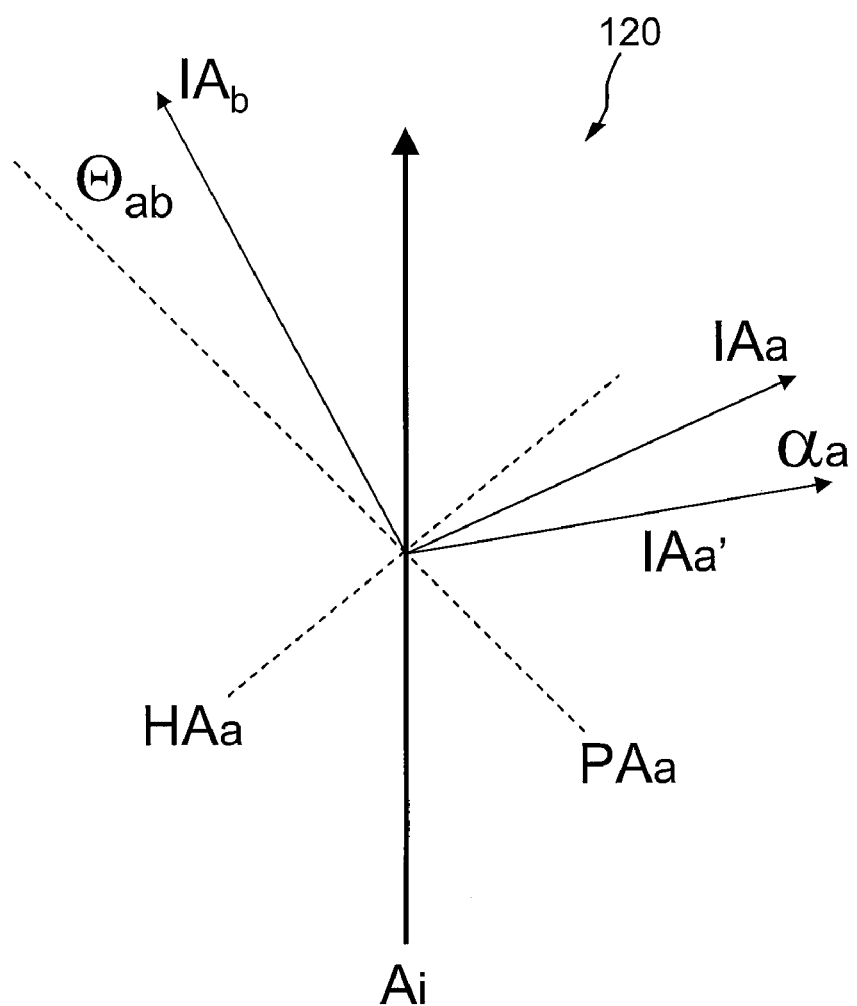
FIG. 3 is a vector diagram that further illustrates vibropendulous error.

FIG. 3 is a vector diagram 150 diagram 120 further illustrating vibropendulous error. With respect to an acceleration in the $A_a$ axis for a sensor "a", an input axis, $IA_a$, a hinge axis, $HA_a$, and a pendulous axis, $PA_a$ are shown. The input axis rotates about the hinge axis, thereby coupling into a sensor located in the cross axis. More specifically, an acceleration in the input axis, $IA_a$, causes a rotation ($\alpha_a$) of the input axis, $IA_a$ into the pendulous axis, $PA_a$. The rotation, $\alpha_a$, is equal to an acceleration, $A_a$ multiplied by a spring constant of the hinge holding the input sensor for the "a" sensor. In one embodiment, the rotation is approximately equal to 25 urad/g).

A simultaneous acceleration in one of the cross axes, for example, an input into the axis of a sensor "b", which is orthogonal to sensor "a", the input referred to as $IA_b$, is a causes of vibropendulous error which is stated mathematically as, Vibropendulous error=$\alpha_a \times A_b \times \cos(\theta_{ab})$. Under the dynamic conditions of an operating accelerometer, the vibropendulous error, producing a bias shift that is referred to as vibropendulous rectification (VPR).

In an embodiment, vibropendulous rectification correction is accomplished utilizing an algorithm embedded in the operational software associated with the accelerometer, for example, within a processor of a navigational system. These rectifications are provided at a sampling rate that is related to a dynamic input spectrum associated with the sensor. In a specific embodiment, where three orthogonally situated accelerometers are associated with, for example, a navigation device, and the respective accelerometers are situated along the axes a, b, and c, the vibropendulous rectification corrections are calculated as:

$VPR_a=K_H \times A_a \times [A_b \times \cos(\theta_{ab})+A_c \times \cos(\theta_{ac})]$, $VPR_b=K_H \times A_b \times [A_a \times \cos(\theta_{ba})+A_c \times \cos(\theta_{bc})]$, and $VPR_c=K_H \times A_c \times [A_a \times \cos(\theta_{ca})+A_b \times \cos(\theta_{cb})]$, where $A_x$ is the acceleration or velocity data received from sensor x, $K_H$ is a spring constant associated with the hinge of the sensor, and $\theta_{xy}$ is the angle between the pendulous axis of sensor x and the input axis of sensor y.

Figure 4:
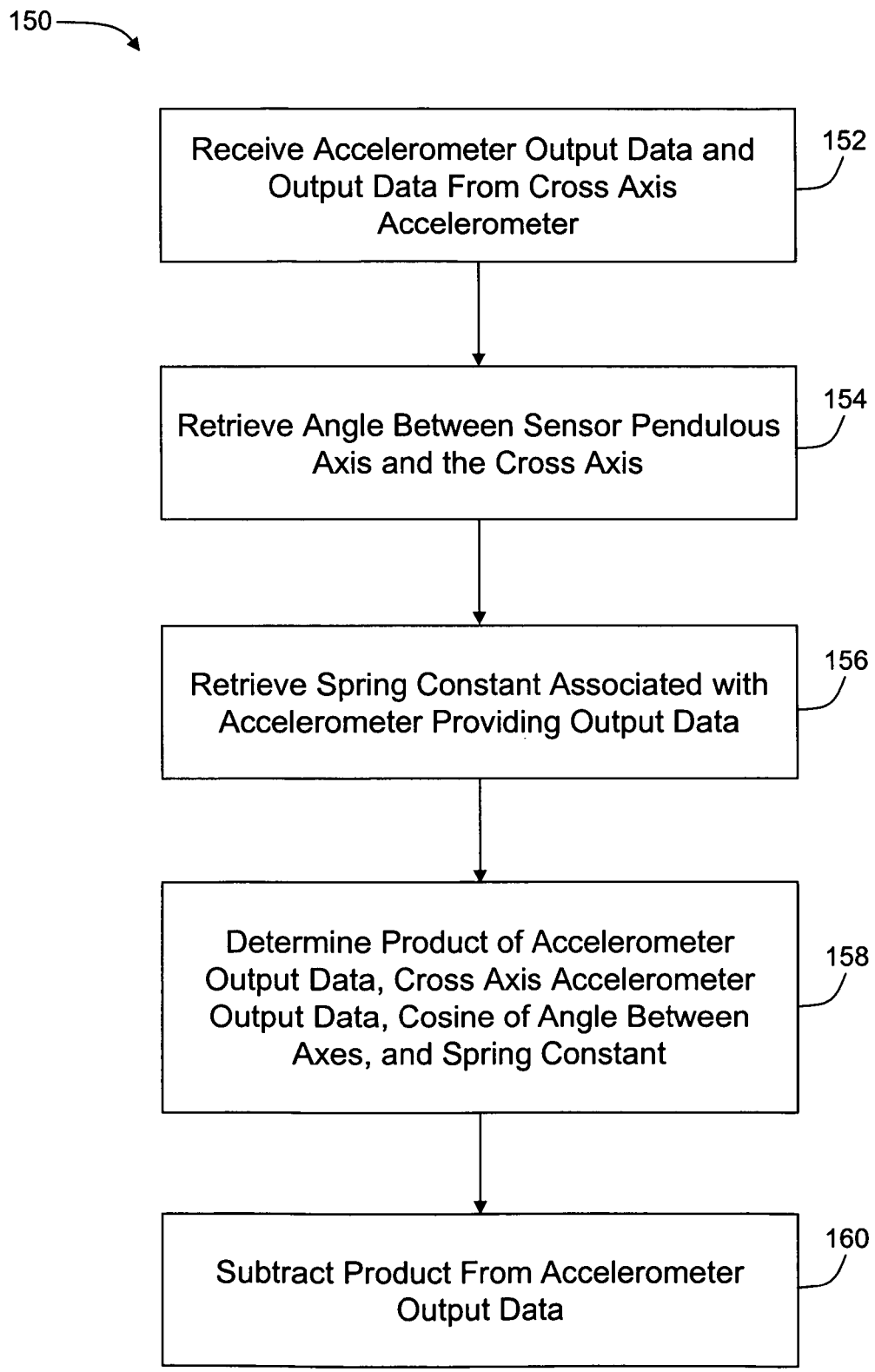
FIG. 4 is a flowchart of a process that compensates for vibropendulous errors.

FIG. 4 is a flowchart 150 that illustrates determination of vibropendulous rectification corrections. Specifically, sensor axis output data and cross axis sensor output data are received 152 from respective accelerometers. The angle between the pendulous axis of the accelerometer and the cross axis is then retrieved 154. A spring constant associated with the accelerometer to be compensated is retrieved 156 and a product of the sensor axis output data, cross axis sensor output data, the cosine of the angle between the sensor pendulous axis and the cross axis, and a factor representing the spring constant is calculated 158, providing a correction term. This correction term is then subtracted 160 from the sensor data.

For accelerometers mounted in an orthogonal triad the vibropendulous errors in each axis can be compensated utilizing a software algorithm. Such an algorithm is executed at a sampling rate that is appropriate for the dynamic input spectrum associated with the accelerometers. In one embodiment, two compensation terms are calculated for each sensor (accelerometer). More specifically, one compensation term is calculated for each of the two respective cross axis sensors associated with a particular accelerometer. As described above, each compensation term is equal to the product of the sensor axis output data, the cross axis sensor output data, the cosine of the angle between the sensor pendulous axis and the cross axis, and a factor representing the spring constant of the sensor pendulum. The correction term is then subtracted from the sensor output data. When dynamic accelerations are applied in an axis oblique to the triad principle axes, the algorithm corrects for the bias shift that would otherwise occur due to rectification of the vibropendulous errors.

The above described method and systems utilize the capabilities and characteristics of three orthogonally positioned sensors, for example, MEMS-based accelerometers and accelerometers fabricated from discrete components such as strain gauge accelerometers and piezoelectric accelerometers, to perform signal corrections for each individual sensor, based on a position of the other two sensors. These methods and systems utilize algorithms, described herein, to determine correction factors to be applied to output data received from each individual sensor, based on operational characteristics of the other two sensors. Such methods and systems are at least more cost effective than known solutions which address vibropendulous errors as those solutions typically implement an auxiliary (or fourth) sensor (accelerometer).

While the invention has been described in terms of various specific embodiments, those skilled in the art will recognize that the invention can be practiced with modification within the spirit and scope of the claims.

What is claimed is:

1. A method for reducing effects of vibropendulous errors within a sensor device having three orthogonal sensors, said method comprising:

calculating compensation terms for each sensor, the compensation terms for each sensor associated with data received from each of the three orthogonal sensors, and the respective angles between a pendulous axis for the sensor and a respective input axis of the other two sensors;

subtracting the compensation terms for each sensor from data received from that sensor, resulting in compensated sensor data; and utilizing the compensated sensor data within a navigation system.

2. A method according to claim 1 wherein calculating compensation terms associated with a respective input axis of the other two sensors comprises calculating a compensation term relating to each cross-axis of the sensor.

3. A method according to claim 1 wherein calculating compensation terms for each sensor comprises calculating compensation terms for each sensor based on a spring constant associated with the sensor.

4. A method according to claim 1 wherein calculating compensation terms for each sensor comprises calculating compensation terms at a sampling rate related to dynamic operating conditions associated with the sensor.

5. A method according to claim 1 wherein calculating compensation terms for each sensor comprises calculating compensation terms according to $VPR_a = K_H \times A_a \times [A_b \cos(\theta_{ab}) + A_c \times \cos(\theta_{ac})]$, where $K_H$ is a spring constant of the hinge for sensor a, $A_a$ is the velocity or acceleration data received from sensor a, $A_b$ is the velocity or acceleration data received from sensor b, $A_c$ is the velocity or acceleration data received from sensor c, $\theta_{ab}$ is the angle between the pendulous axis of sensor a and the input axis of sensor b, and $\theta_{ac}$ is the angle between the pendulous axis of sensor a and the input axis of sensor c.

6. A method according to claim 1 wherein the sensors are accelerometers.

7. A navigation system comprising:

a processor; and three orthogonally positioned accelerometers each said accelerometer configured to provide acceleration data to said processor, said processor programmed to compensate the acceleration data received from each said accelerometer; wherein each compensation is based on data received from the three accelerometers, the respective angles between a pendulous axis for a respective said accelerometer and an input axis of the other accelerometers, and is directed to reducing effects of vibropendulous error.

8. A navigation system according to claim 7 wherein said processor is configured to compensate the acceleration data received from each said accelerometer by subtracting a compensation term associated with each cross axis accelerometer from the acceleration data received from said accelerometer.

9. A navigation system according to claim 8 wherein the compensation term for each said accelerometer is further dependent upon a spring constant associated with each said accelerometer.

10. A navigation system according to claim 7 wherein said processor is configured to compensate the acceleration data received from each said accelerometer at a sampling rate related to dynamic operating conditions associated with each said accelerometer.

11. A navigation system according to claim 7 wherein said processor is configured to calculate compensation terms for a said accelerometer, a, according to $VPR_a = K_H \times A_a \times [A_b \times \cos(\theta_{ab}) + A_c \times \cos(\theta_{ac})]$, where $K_H$ is a spring constant of the hinge for accelerometer a, $A_x$ is the velocity or acceleration data received from accelerometer x, $\theta_{ab}$ is the angle between the pendulous axis of accelerometer a and the input axis of sensor b, and $\theta_{ac}$ is the angle between the pendulous axis of sensor a and the input axis of accelerometer c.

12. A navigation system according to claim 7 wherein said accelerometers comprise at least one of piezoelectric accelerometers, strain gauge accelerometers, and micro-electromechanical system based accelerometers.

13. An inertial measurement unit comprising three orthogonally positioned accelerometers, each said accelerometer configured to provide acceleration data, said inertial measurement unit programmed to compensate the acceleration data received from each said accelerometer to reduce effects of vibropendulous error, wherein said compensation is based on data received from each of said three accelerometers, and the angles between a pendulous axis for a respective said accelerometer and each cross axis of the respective said accelerometer.

14. An inertial measurement unit according to claim 13 programmed to compensate the acceleration data from each said accelerometer by subtracting a compensation term associated with each cross axis accelerometer from the acceleration data from said accelerometer.

15. An inertial measurement unit according to claim 14 wherein the compensation term for each said accelerometer is further dependent upon a spring constant associated with each said accelerometer.

16. An inertial measurement unit according to claim 13 programmed to compensate the acceleration data received from each said accelerometer at a sampling rate related to dynamic operating conditions associated with each said accelerometer.

17. An inertial measurement unit according to claim 13 programmed to calculate compensation terms for a said accelerometer, a, according to $VPR_a = K_H \times A_a \times [A_b \times \cos(\theta_{ab}) + A_c \times \cos(\theta_{ac})]$, where $K_H$ is a spring constant of the hinge for accelerometer a, $A_x$ is the velocity or acceleration data received from accelerometer x, $\theta_{ab}$ is the angle between the pendulous axis of accelerometer a and the input axis of sensor b, and $\theta_{ac}$ is the angle between the pendulous axis of sensor a and the input axis of accelerometer c.

18. An inertial measurement unit according to claim 13 wherein said accelerometers comprise at least one of piezoelectric accelerometers, strain gauge accelerometers, and micro-electromechanical system based accelerometers.

* * * * *